United States
Zehender

4,219,867
Aug. 26, 1980

[54] VEHICLE HEADLIGHT WITH POLARIZED AND NON-POLARIZED LIGHT EMISSION

[75] Inventor: Ernst Zehender, Althengstett-Ottenbrunn, Fed. Rep. of Germany

[73] Assignee: Robert Bosch GmbH, Stuttgart, Fed. Rep. of Germany

[21] Appl. No.: 954,640

[22] Filed: Oct. 25, 1978

[30] Foreign Application Priority Data

Dec. 1, 1977 [DE] Fed. Rep. of Germany ....... 2753545

[51] Int. Cl.² .......................... F21V 9/14; B60Q 1/00; G02B 5/30
[52] U.S. Cl. ...................... 362/19; 362/61; 362/301; 350/147; 350/152
[58] Field of Search ............ 362/19, 35, 61, 83, 362/213, 215, 280, 292, 301, 303, 347; 350/147, 152, 154, 156

[56] References Cited
U.S. PATENT DOCUMENTS

| | | | |
|---|---|---|---|
| 3,808,422 | 4/1974 | Handtmann | 362/19 |
| 3,935,444 | 1/1976 | Zechnall | 362/19 |

FOREIGN PATENT DOCUMENTS

| | | | |
|---|---|---|---|
| 500843 | of 0000 | Italy | 362/19 |
| 880374 | 10/1961 | United Kingdom | 362/19 |

Primary Examiner—Donald P. Walsh
Attorney, Agent, or Firm—Frishauf, Holtz, Goodman & Woodward

[57] ABSTRACT

In order to improve the near-field illumination provided by motor vehicle headlights having a polarized light output, the headlight is provided with mirrors which intercept non-polarized light from the parabolic reflector and direct it through diffuser plates for near-field illumination alongside the central polarized beam. The rear surface of mirrors already present for bending the central polarized beams is made reflective and a second set of plane parallel mirrors is provided for bending the light reflected from the rear surfaces of the first set of mirrors back into the direction of the optical axis.

4 Claims, 3 Drawing Figures

U.S. Patent  Aug. 26, 1980  4,219,867
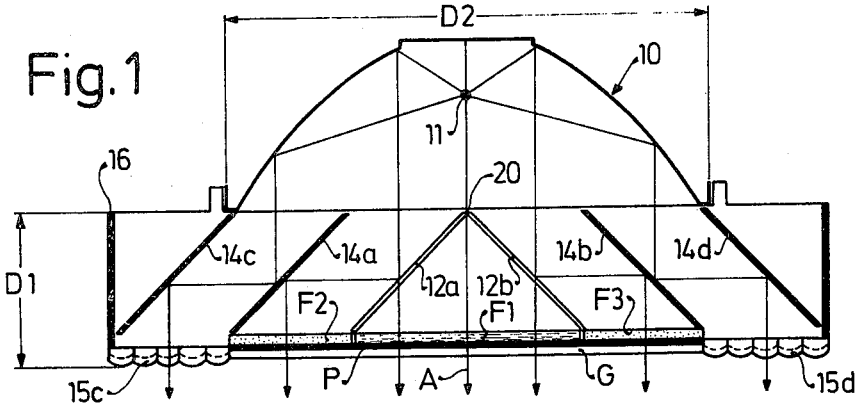
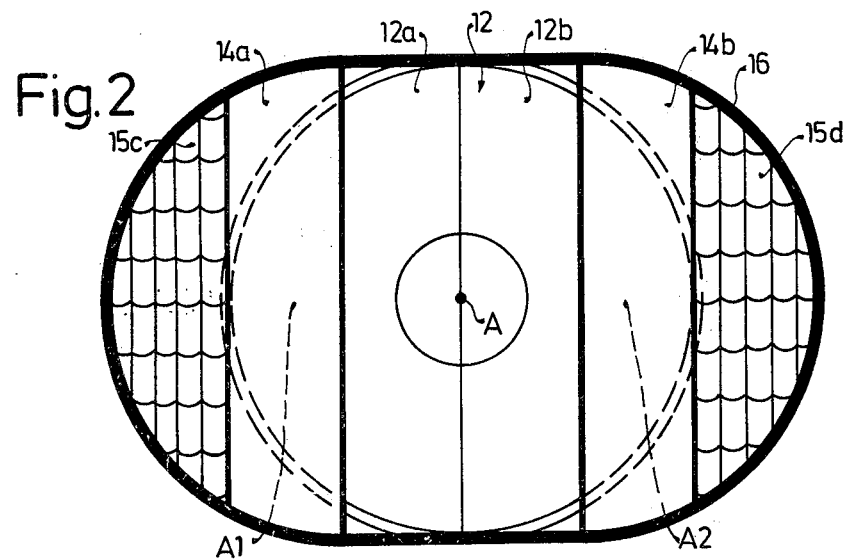
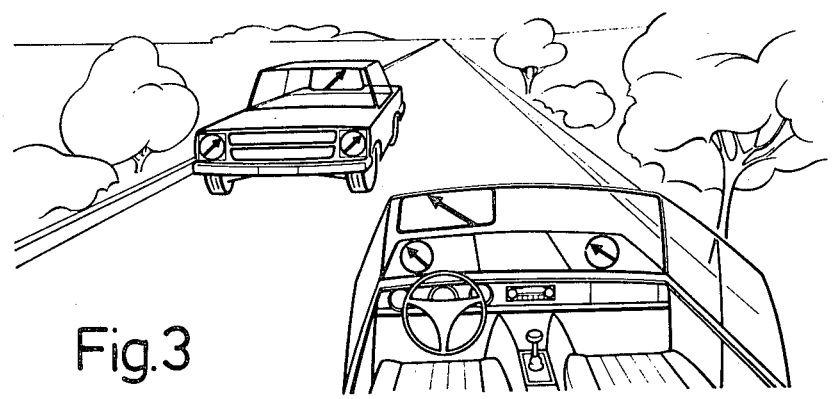

VEHICLE HEADLIGHT WITH POLARIZED AND NON-POLARIZED LIGHT EMISSION

FIELD OF THE INVENTION

The invention relates to the headlights of motor vehicles and more particularly to headlights in which at least part of the emitted light is polarized.

BACKGROUND AND PRIOR ART

A motor vehicle headlight of the general type to which this invention relates is known from the U.S. Pat. No. 3,808,422, in particular its FIG. 4. The known headlight described there includes a parabolic mirror having a light source located substantially at the focus and an interference type polarizer which intercepts the light emitted by the parabolic mirror and divides it into two transverse polarized beams which are then reflected by plane mirrors and emitted by the headlight in the direction of the optical axis. In the known headlight, all of the light emitted is polarized and serves as both high and low beam. There is no provision for any unpolarized emitted light. In any transition from the use of unpolarized light sources such as are common today to a glare-free polarized lighting system of the future, it must be expected that transitional difficulties will occur. For example, generally speaking, loss-free headlights emitting polarized light tend to be larger and thus are not readily exchangeable for the headlights in use today. Furthermore, at least during the transition period, it will have to be possible to switch from low to high beams even with polarized light. However, in the low beam mode, it is virtually impossible to see polarized headlights on vehicles traveling in the opposite direction. Furthermore, it has been found that when polarized light of the same intensity as unpolarized is used to illuminate the near field, the field illuminated by unpolarized light appears to be less bright. This phenomenon appears to be due to the non-uniform depolarization of the light returned to the eye of the driver from the near and far fields, respectively.

SUMMARY OF THE INVENTION

It is an object of the invention to provide a vehicle headlight of the general type described above but with the additional advantage of avoiding the aforementioned difficulties. It is a particular object of the present invention to provide a vehicle headlight in which there is a provision to generate both polarized and unpolarized light, the latter serving for the near-field illumination.

Briefly, the invention provides a parabolic mirror, a folded interference polarizer and parallel mirrors to generate the polarized component of the emitted light and, in addition thereto, the invention provides for the parallel plane mirrors to be reflective on their rear surface, thereby permitting non-polarized light to be reflected onto two further parallel mirrors which then emit the non-polarized portion of the light in the direction of the optical axis and parallel to the central polarized component.

In a further feature of the invention, there is provided a set of half-wave plates for rotating the plane of polarization of the polarized components appropriately so as to impart to the emitted light a preferred and unique plane of polarization. In a still further feature of the invention, any remaining non-polarized light within the extent of the polarized beam is removed by the installation of an overall polarizing filter.

Still another feature of the invention is to provide diffuser plates for directing the non-polarized light principally in the near-field direction.

Further details and advantages of the invention will emerge from a description of a preferred embodiment which is illustrated in the drawing.

BRIEF DESCRIPTION OF THE DRAWING

FIG. 1 is a section through an embodiment of the headlight according to the invention taken along the optical axis;

FIG. 2 is a front view of the headlight according to the invention; and

FIG. 3 is a panoramic view of two mutually approaching vehicles in which the headlights and parts of the windshield are polarized in the manner indicated by arrows.

DETAILED DESCRIPTION OF THE INVENTION

The headlight illustrated in FIGS. 1 and 2 includes a principal reflector embodied as a parabolic mirror 10 and a light source 11 located substantially at its focal point. The light emitted from the light source is reflected by the parabolic mirror 10 and is emitted in the direction of the optical axis A. Disposed in the beam emerging from the parabolic mirror 10 is an interference-type polarizer 12. The interference polarizer 12 is divided into two partial polarizers 12a, 12b by being folded along a line 20 which is perpendicular to the optical axis. The angle of inclination of the two partial polarizers 12a, 12b with respect to the optical axis is 45°. The presence of the interference polarizer 12 causes the impinging beam which is parallel to the optical axis A to be divided into three linearly polarized partial beams of which the principal one continues in the original direction along the optical axis and passes through the interference polarizer 12. The second partial beam, for example that reflected by the partial polarizer 12a, is directed toward the left as seen in FIG. 1, perpendicular to the optical axis, whereas the third partial beam is reflected by the partial polarizer 12b to the right as seen in FIG. 1 and also perpendicular to the optical axis A. The lateral extent of the first partial beam is the entire width of the interference polarizer 12.

In the first transmitted beam which continues in the original direction, the electric field vector is parallel to the plane of the drawing and is perpendicular to the optical axis A. In the linearly polarized partial beams being reflected to the left and to the right as seen in FIG. 1, the electric field vector is perpendicular to the plane of the drawing. In order to return the second and third beams into a direction parallel to the optical axis, there are provided, respectively, plane mirrors 14a and 14b, which are parallel to the partial polarizers 12a and 12b, respectively. The disposition of the plane mirrors 14a, 14b is such that their projections onto a plane defined by the optical axis and by the apex line 20 of the polarizer 12 is congruent with the projection onto that same plane of the partial polarizers 12a and 12b except for a possible very slight rounding of the corners of the two plane mirrors 14a, 14b such as seen for example in FIG. 2b. The plane mirrors 14a and 14b are further disposed in such a manner that their projections onto a plane perpendicular to the optical axis A are contiguous to the projections of the partial polarizers 12a and 12b onto that same plane.

The second and third partial beams reflected, respectively, by the plane mirrors 14a and 14b, are still linearly polarized after their reflection. The electric field vector is still perpendicular to the plane of the drawing whereas the electric field vector of the central beam which traverses the polarizer 12 remains parallel to the plane of the drawing and perpendicular to the optical axis A.

In order to impart to all three of the polarized partial beams a uniform plane of polarization, such as for example the obliquity of the polarization vector at 45° or 135° as illustrated in FIG. 3, which is particularly advantageous for the use in traffic, there is provided a set of rectangular half-wave plates $F_1$, $F_2$, and $F_3$ which are disposed in the partial beams. The preferred direction of the half-wave plates $F_2$ and $F_3$ is identical and is made perpendicular to that of the central half-wave plate $F_1$. After passage through the three half-wave plates ($\lambda/2$ plates) $F_1$, $F_2$, $F_3$, the three partial beams will have acquired a uniform direction of polarization. However, each beam still contains an undesirable unpolarized component of light. In order to remove this unpolarized component, a polarization filter P is provided in such a way as to cover all three half-wave plates $F_1$, $F_2$, $F_3$. Covering the filter P is a glass cover plate G.

It is a specific object of the present invention to provide, in addition to the polarized light emerging from the absorption type polarization filter P, an unpolarized beam which is to serve principally for near-field illumination. For this purpose, the invention provides that the rear surface of the two plane mirrors 14a, 14b is also made reflective and the lateral extent of the parabolic mirror 10 is such as to provide illumination to the silvered rear surface of the plane mirrors 14a, 14b in regions $A_1$ and $A_2$. In order to return the light reflected from the rear surface of the two plane mirrors 14a, 14b into the direction of the optical axis, there are provided two further plane mirrors 14c, 14d which are parallel to the plane mirrors 14a, 14b and are so disposed that their projections onto a plane perpendicular to the optical axis are contiguous to the projection of the plane mirrors 14a, 14b and that their projections onto a plane defined by the optical axis and by the apex line 20 of the polarizer 12 do not extend beyond similar projections thereon of the plane mirrors 14a, 14b. Diffuser plates 15c, 15d placed in the beam of the light reflected from the plane mirrors 14c and 14d, respectively, serve to direct the emerging unpolarized light in the proper manner for near-field illumination.

The linearly polarized light which emerges from the absorption type polarizing filter P is intended principally for high-beam illumination but may also be used for near-field, low-beam uses, the switchover being made by known and suitable means not further illustrated.

The embodiment of a headlight according to the invention for generating both polarized and unpolarized light may be realized in practice by providing a substantially oval flange 16 which contains and supports the interference polarizer 12 and the various mirrors 14 which may be embodied, for example, as plates made from, for example, lucite or the like. The flange 16 would be used in association with a conventional round headlight.

In the present exemplary embodiment, the thickness $D_1$ of the flange 16 is approximately one quarter of the diameter $D_2$ of the parabolic mirror 10. The long axis of the oval flange 16 is equal to 1½ times the length of the mirror diameter $D_2$. If the flange including the elements according to the invention is provided as a retrofit for conventional headlights, the conversion to a polarized system according to the invention is made substantially less expensive and easier.

Various changes and modifications may be made to the embodiment described without departing from the scope of the inventive concept.

I claim:

1. A headlight for motor vehicles, comprising:
   a parabolic mirror (10),
   means for supporting a light source (11) at the focus thereof,
   an interference polarizer (12) comprising two partial, plane, polarizer plates (12a, 12b) disposed at an angle of 45° with respect to one another and joined along an apex line (20) which intersects the optical axis of said parabolic mirror at right angles
   two first plane mirrors (14a, 14b) disposed, respectively, laterally parallel to said partial polarizer plates (12a, 12b) and in such a manner that the projections of said first plane mirrors (14a, 14b) onto a plane defined by said optical axis and by said apex line (20) are substantially congruent with the projections thereon of said partial polarizer plates (12a, 12b) and that the projections of said first plane mirrors (14a, 14b) onto a plane perpendicular to the optical axis are continguous without overlap to the projections thereon of said partial polarizer plates (12a, 12b),
   means ($F_1$, $F_2$, $F_3$) for rotating the plane of polarization of the light from said polarizer (12)
   and wherein, the rear surfaces of said first plane mirrors (14a, 14b) facing said parabolic mirror are rendered reflective so as to intercept and deviate laterally light from said parabolic mirror;
   and two second plane mirrors (14c, 14d) are provided, disposed parallel, respectively, to said first plane mirrors (14a, 14b) and in such a manner that their projections onto a plane defined by said optical axis and by said apex line (20) do not extend beyond the projections thereon of said first plane mirrors (14a, 14b) and that their projections onto a plane perpendicular to the optical axis are contiguous without overlap to the projections thereon of said first plane mirrors (14a, 14b),
   whereby light emitted from said source which has not been polarized will be, reflected laterally by the rear surfaces of said first plane mirrors (14a, 14b) and is then reflected forward by said second plane mirrors (14c, 14d) in the direction of the optical axis to provide a mixture of polarized and unpolarized light, the polarized light being radiated essentially in the direction of said optical axis.

2. A headlight according to claim 1, wherein, according to the invention, there are provided three half-wave plates ($F_1$,$F_2$,$F_3$), disposed respectively to intercept the beam emerging after transmission through said polarizer plate (12) and the beams reflected from said first plane mirrors (14a, 14b); whereby the plane of polarization of the light emerging from said half-wave plates ($F_1$,$F_2$,$F_3$) is made uniform.

3. A headlight according to claim 2, further comprising a polarization filter (P) disposed to intercept the light emerging from all three half-wave plates ($F_1$,$F_2$,$F_3$) for suppressing non-polarized light components.

4. A headlight according to claims 1, 2 or 3, further comprising diffuser plates (15c, 15d) disposed, respectively, in the path of light reflected by said second plane mirrors (14c, 14d) for directing non-polarized light for near-field illumination.

* * * * *